(12) United States Patent
Howarth

(10) Patent No.: US 9,753,300 B2
(45) Date of Patent: Sep. 5, 2017

(54) SHAPE MEMORY ALLOY ACTUATION APPARATUS

(71) Applicant: CAMBRIDGE MECHATRONICS LIMITED, Cambridge, Cambridgeshie (GB)

(72) Inventor: James Howarth, Cambridge (GB)

(73) Assignee: CAMBRIDGE MECHATRONICS LIMITED, Cambridge, Cambridgeshire (GB)

( * ) Notice: Subject to any disclaimer, the term of this patent is extended or adjusted under 35 U.S.C. 154(b) by 26 days.

(21) Appl. No.: 14/378,893

(22) PCT Filed: Feb. 18, 2013

(86) PCT No.: PCT/GB2013/050382
§ 371 (c)(1),
(2) Date: Aug. 14, 2014

(87) PCT Pub. No.: WO2013/121225
PCT Pub. Date: Aug. 22, 2013

(65) Prior Publication Data
US 2015/0346507 A1 Dec. 3, 2015

(30) Foreign Application Priority Data
Feb. 16, 2012 (GB) .................................. 1202693.6
May 17, 2012 (GB) .................................. 1208713.6

(51) Int. Cl.
*G02B 27/64* (2006.01)
*G02B 7/02* (2006.01)
(Continued)

(52) U.S. Cl.
CPC ............. *G02B 27/646* (2013.01); *F03G 7/06* (2013.01); *G02B 7/023* (2013.01); *G03B 3/10* (2013.01);
(Continued)

(58) Field of Classification Search
CPC ........ G02B 27/646; G02B 7/023; G02B 3/10; G02B 5/00; G02B 27/64; G02B 7/04;
(Continued)

(56) References Cited

U.S. PATENT DOCUMENTS 7,663,811 B2 * 2/2010 Noda ........................ G03B 3/10
359/554
8,050,553 B2 * 11/2011 Chiu ........................ G03B 3/10
396/542
(Continued)

FOREIGN PATENT DOCUMENTS

GB WO 2010049689 A2 * 5/2010 ............. F03G 7/065
WO WO-2007113478 A1 10/2007
(Continued)

*Primary Examiner* — Ricky Mack
*Assistant Examiner* — Kristina Deherrera
(74) *Attorney, Agent, or Firm* — Harness, Dickey & Pierce, P.L.C.

(57) ABSTRACT

An SMA actuation apparatus (1) comprises a support structure (4) on which a movable element (2) is supported. Four SMA actuator wires (11-14) are connected at their ends to one of the support structure (4) and the movable element (2) and being hooked over a respective connector (7) connected to the other. Pairs of the SMA actuator wires (11-14), on contraction, to drive movement of the movable element (2) relative to the support structure (4), through the respective connectors (7), in opposite directions in said plane (XY), that are orthogonal as between the pairs. Each connector (7) is compliant laterally to the direction in which the respective SMA actuator wire (11-14) drives movement of the movable element (2) relative to support structure (4).

27 Claims, 4 Drawing Sheets

(51) Int. Cl.
*F03G 7/06* (2006.01)
*G03B 3/10* (2006.01)
*G03B 5/00* (2006.01)

(52) U.S. Cl.
CPC ........ *G03B 5/00* (2013.01); *G03B 2205/0007* (2013.01); *G03B 2205/0076* (2013.01); *G03B 2217/005* (2013.01)

(58) Field of Classification Search
CPC .. G02B 27/642; G02B 27/644; G02B 27/648; F03G 7/06; H04N 5/23264; G03B 2205/0007
USPC ................ 359/554–557, 694–706, 813–814, 359/822–826; 348/207.99–376
See application file for complete search history.

(56) References Cited

U.S. PATENT DOCUMENTS

| | | | | |
|---|---|---|---|---|
| 8,830,335 B2* | 9/2014 | Topliss | ............... | G02B 7/08 348/208.11 |
| 9,155,593 B2* | 10/2015 | Feiertag | ............... | A61B 3/0075 |
| 2001/0022688 A1* | 9/2001 | Kosaka | ............... | G02B 27/646 359/557 |
| 2006/0266031 A1 | 11/2006 | Kosaka et al. | | |
| 2008/0278030 A1 | 11/2008 | Hara et al. | | |
| 2009/0052037 A1 | 2/2009 | Wernersson | | |
| 2011/0102920 A1 | 5/2011 | Shyu et al. | | |

FOREIGN PATENT DOCUMENTS

| | | |
|---|---|---|
| WO | WO-2008-099155 A1 | 8/2008 |
| WO | WO-2010/029316 A2 | 3/2010 |
| WO | WO-2010089529 A1 | 8/2010 |
| WO | WO-2011/104518 A1 | 9/2011 |
| WO | WO-2013/118601 A1 | 8/2013 |
| WO | WO-2013/153400 A2 | 10/2013 |
| WO | WO-2013/175197 A1 | 11/2013 |

\* cited by examiner

SHAPE MEMORY ALLOY ACTUATION APPARATUS

CROSS REFERENCE TO RELATED APPLICATIONS

This application is a U.S. National Phase Application under 35 U.S.C. 371 of International Application No. PCT/GB2013/050382 filed on Feb. 18, 2013, which claims priority to British Patent Applications No. 1202693.6 filed on Feb. 16, 2012 and No. 1208713.6 filed on May 17, 2012. The contents of the above applications are incorporated herein by reference.

The present invention relates to the use of SMA (shape memory alloy) actuator wires to provide positional control of a movable element supported on a support structure.

There are a variety of types of apparatus in which it is desired to provide positional control of a movable element. SMA actuator wire is advantageous as an actuator in such an apparatus, in particular due to its high energy density which means that the SMA actuator required to apply a given force is of relatively small size.

One type of apparatus in which SMA actuator wire is known for use as an actuator is a camera, particularly a miniature camera. Some examples are as follows. WO-2007/113478 discloses an SMA actuation apparatus in which SMA actuator wire is used to drive movement of a camera lens element along the optical axis, for example for the purpose of focussing an image formed by the camera lens element on an image sensor. WO-2010/029316 and WO-2010/089529 each disclose an SMA actuation apparatus in which SMA actuator wire is used to provide optical image stabilisation (OIS) in a camera by driving tilting of a camera unit including a camera lens element and an image sensor. The tilting is controlled to stabilise the image formed by the camera lens element on an image sensor against vibration, typically caused by user hand movement, that degrades the quality of the image captured by the image sensor. WO-2011/104518 discloses an SMA actuation apparatus in which SMA actuator wire is used to provide OIS in a camera by driving tilting of a camera unit, but with additional degrees of freedom. In that mechanism, eight SMA actuator wires are used, arranged as four pairs of crossed wires parallel to the four faces of the camera unit. While providing versatile shake correction, and additionally an optional integrated AF function, this system requires physical and electric connections to be made to both ends of each of the wires, that is 16 connections. Clearly this causes considerable manufacturing and reliability challenges.

The present invention is concerned with an SMA actuation apparatus for moving a movable element relative to a support structure in any direction in a plane. In that case, reduced numbers of SMA actuator wires may in principle be used, as compared to WO-2011/104518 for example. However, it remains necessary to provide an arrangement of SMA actuator wires that provides the desired movement.

According to the present invention, there is provided an SMA actuation apparatus for moving a movable element relative to a support structure, the SMA actuation apparatus comprising:

a support structure;

a movable element supported on the support structure in a manner allowing movement of the movable element relative to the support structure in any direction in a plane; and four SMA actuator wires, each SMA actuator wire being connected at its ends to one of the support structure and the movable element and being hooked over a respective connector connected to the other of the of the support structure and the movable element, a first pair of the SMA actuator wires being arranged, on contraction, to drive movement of the movable element relative to the support structure, through the respective connectors, in opposite directions along a first axis in said plane, a second pair of the SMA actuator wires being arranged, on contraction, to drive movement of the movable element relative to the support structure, through the respective connectors, in opposite direction along a second axis in said plane orthogonal to said first axis, wherein each connector is compliant laterally to the direction in which the respective SMA actuator wire drives movement of the movable element relative to support structure.

In this SMA actuation apparatus, movement in any direction in a plane is achieved using four SMA actuator wires. This improves manufacturability and reliability as compared to an apparatus using a larger number of SMA actuator wires, whilst still providing the desired movement.

Each SMA actuator wire is connected at its ends to one of the support structure and the movable element and is hooked over a respective connector connected to the other of the support structure and the movable element. This allows the SMA actuator wires to drive movement of the movable element relative to the support structure, through the respective connectors. A first pair of the SMA actuator wires are arranged to drive such movement in opposite directions along a first axis in said plane, and a second pair of the SMA actuator wires are arranged to drive such movement in opposite direction along a second axis in said plane orthogonal to said first axis. Thus, movement in any direction in the plane may be driven by selective operation of the SMA actuator wires. This may be achieved whilst minimising the height of the SMA actuator apparatus in a direction perpendicular to the plane. This is because the SMA actuator wires may be arranged parallel to the plane, or else at a small angle thereto, such that the SMA actuator wires have a small extent in that direction.

Due to the connectors being laterally compliant, the connectors accommodate the movement of the movable element relative to the respective SMA actuator wires that is driven by the other pair of SMA actuator wires. That is, the movement of the movable element driven by the first pair of SMA actuator wires along the first axis is accommodated by the connectors of the second pair of SMA actuator wires, and vice versa. This prevents the movements driven by the two pairs of SMA actuator wires from hindering each other.

For convenience of design and construction, each SMA actuator wire may be connected at its ends to the same one of the support structure and the movable element. Connection of each SMA actuator wire at its ends to the support structure provides the advantage of making it simpler to make electrical connections to the SMA actuator wires to a control circuit in the normal case that the control circuit is mounted to the support structure. However, in general any of the SMA actuator wires may be connected at their ends to the support structure and any of the SMA actuator wires may be connected at their ends to the movable element, without affecting the overall function.

Such benefits may be achieved employing just a single set of four SMA actuator wires, which provides for a very simple and compact arrangement.

The SMA actuation apparatus may be used to drive movement of a variety of different types of movable element for a variety of purposes.

In one example, the SMA actuation apparatus may be used to provide a camera with OIS. In this example, the SMA actuation apparatus is a camera apparatus further comprising an image sensor fixed to the support structure, and the movable element comprises a camera lens element comprising one or more lenses arranged to focus an image on the image sensor. In this case, the plane may be perpendicular to the optical axis of the camera lens element. The SMA actuation apparatus may then provide OIS by movement of the camera lens element laterally of the optical axis, which may be referred to as "shift" or "OIS-shift". This is advantageous as it reduces the overall size as compared to a camera in which OIS is provided by tilting of a camera unit including a camera lens element and an image sensor, wherein sufficient clearances are needed to accommodate movement of the entire camera unit. The advantages are particularly beneficial in a miniature camera, for example wherein the one or more lenses have a diameter of at most 10 mm.

In order to provide OIS, the camera apparatus may further comprise: a vibration sensor arranged to generate output signals representative of the vibration of the apparatus; and a control circuit arranged to generate drive signals for the SMA actuator wires in response to the output signals of the vibration sensor for stabilising the image sensed by the image sensor, and to supply the generated drive signals to the SMA actuator wires.

To allow better understanding, an embodiment of the present invention will now be described by way of non-limitative example with reference to the accompanying drawings, in which.

Figure 1:
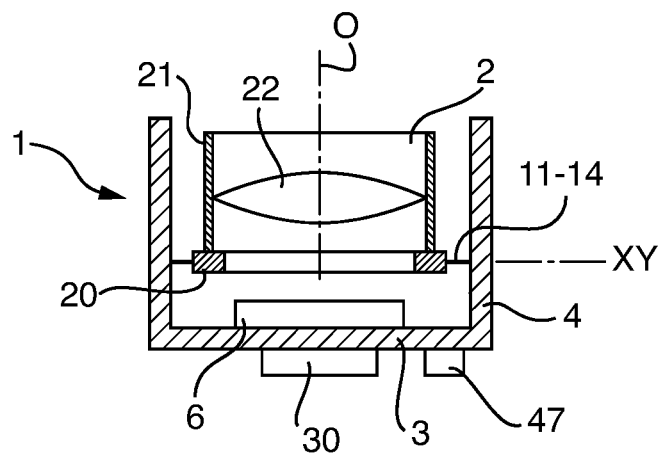
FIG. 1 is a schematic cross-sectional view of a camera apparatus.

A camera apparatus 1 that is an example of an SMA actuation apparatus in accordance with the present invention is shown in FIG. 1, which is a cross-sectional view taken along the optical axis O. The camera apparatus 1 may be incorporated in a portable electronic device such as a mobile telephone, media player, tablet computer or portable digital assistant. Thus miniaturisation is an important design criterion.

The camera apparatus 1 comprises a lens element 2 supported on a support structure 4 by an arrangement of SMA actuator wires 11 to 14, shown schematically in FIG. 1 but described in detail below, in a manner allowing movement of the lens element 2 relative to the support structure 4 in any direction in a plane XY perpendicular to the optical axis O, driven by the SMA actuator wires 11 to 14. Thus, the lens element 2 is a movable element.

In this example, the lens element 2 is supported solely by the SMA actuator wires 11 to 14. Alternatively, support could additionally be provided by a suspension system. A non-limitative example is a suspension system comprising beams connected between the lens element 2 and the support structure 4 and extending parallel to the optical axis O.

The support structure 4 is a camera support supporting an image sensor 6 on the front side of the base 3 of the support structure 4. On the rear side of the base 3, there is mounted an IC (integrated circuit) chip 30, and also a gyroscope sensor 47.

The lens element 2 comprises a mounting ring 20 and a lens carrier 21 in the form of a cylindrical body supporting a lens 22 arranged along the optical axis O, although in general any number of lenses 22 may be provided. The camera apparatus 1 is a miniature camera in which the lens 22 (or lenses 22 if plural lenses are provided) has a diameter of at most 10 mm.

The lens element 2 is arranged to focus an image onto the image sensor 6. The image sensor 6 captures the image and may be of any suitable type, for example a CCD (charge-coupled device) or a CMOS (complimentary metal-oxide-semiconductor) device.

The lens 22 (or lenses 22 if plural lenses are provided) may be fixed relative to the lens carrier 21, or alternatively may be supported on the lens carrier in a manner in which the lens 22 (or at least one of the lenses 22 if plural lenses are provided) is movable along the optical axis O, for example to provide focussing and/or zoom. Where the lens 22 is movable along the optical axis O, a suitable actuation system (not shown) may be provided, for example using a voice coil motor or SMA actuator wires, such as is described in WO-2007/113478.

In operation, the lens element 2 is moved in the plane XY perpendicular to the optical axis O, with the effect that the image on the image sensor 6 is moved laterally. This is used to provide OIS, compensating for image movement of the camera apparatus 1, caused by for example hand shake.

In many known arrangements using SMA actuator wire to provide an OIS function, for example as disclosed in WO-2010/029316 and WO-2010/089529, the OIS is provided by tilting the entire camera unit including the lens element and the image sensor, substantially as a rigid body. This method of compensating for user handshake does in principle give the best OIS performance, because aligning the lens element to the image sensor is difficult in miniature cameras and the manufacturing tolerances are very tight. In addition, the user handshake being compensated for is essentially a tilt to the camera, and so it makes intuitive sense that the compensation should also tilt the camera. However, in this example, OIS is performed differently in order to mitigate several other problems.

The first problem is that with the 'camera tilt' method, the image sensor is moving, relative to the fixed camera structure. This presents difficulties in routing electrical connections from the image sensor to the fixed structure of the camera, and onto the mobile phone motherboard. Solutions to this centre around flexible printed circuits (FPC's) to route connections, but the FPC design remains challenging, owing to the large number of connections, and the high data rates. Therefore, it is highly desirable for the image sensor to remain stationary and fixed.

The second problem is that the camera tilt method implies that there is a camera structure comprising as a minimum the lens and image sensor, with support structures that must tilt inside a surrounding support structure. Because the camera has a finite footprint, the tilt of the camera means that the camera thickness (height) of the OIS camera must be greater than for an equivalent camera without OIS. In mobile phones, it is highly desirable to minimise the camera height.

The third problem, is that by tilting the whole camera, it is difficult to package the tilting actuators without increasing the footprint of the camera over that of the camera without OIS.

Accordingly, in this example, the lens element 2 is moved linearly in the plane XY perpendicular to the optical axis O, which may be termed "shift" or "OIS-shift". The resulting image compensation does not entirely reverse the effects of user handshake, but the performance is deemed sufficiently good, given the constraints described above, and in particular allows the size of the camera apparatus 1 to be reduced as compared to an apparatus using tilt.

Figure 2:
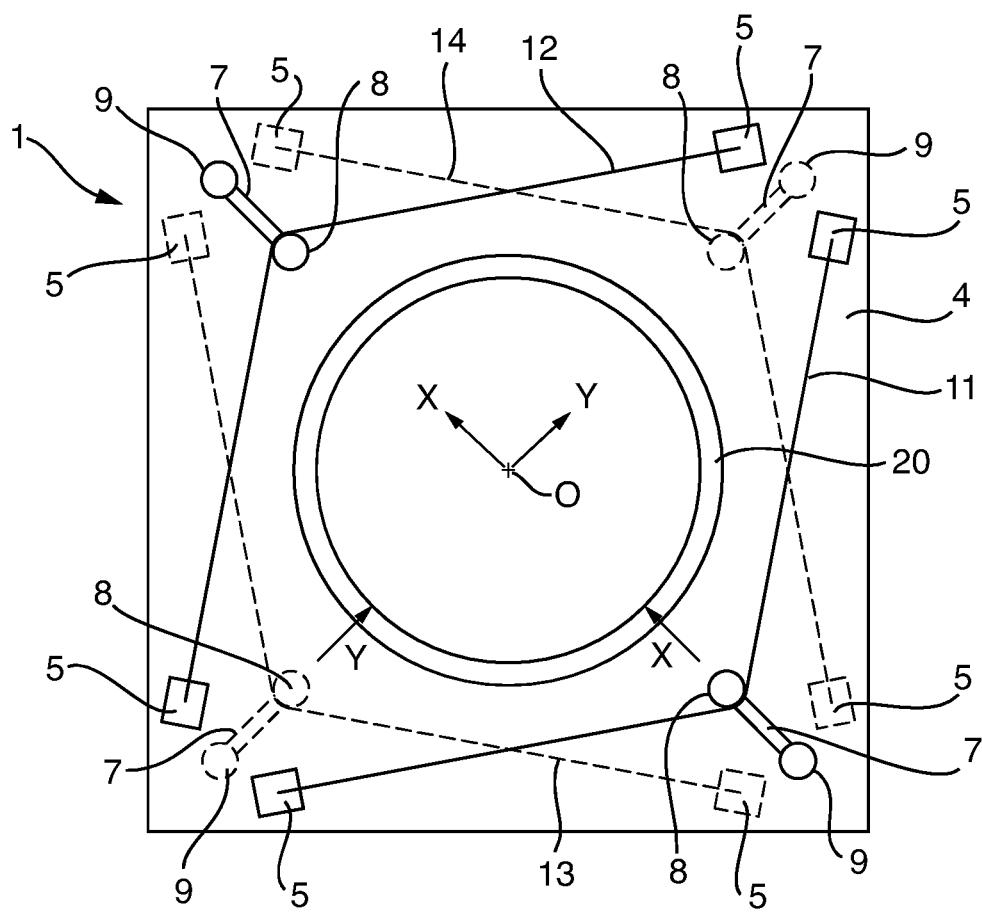
FIG. 2 is a plan view of the camera apparatus viewed along the optical axis.

Movement of the lens element 2 is driven by the four SMA actuator wires 11 to 14 which may be arranged as shown in FIG. 2 which is a view along the optical axis O so that the plane XY is in the plane of the drawing.

The four SMA actuator wires 11 to 14 are connected between the support structure 4 and the lens element 2. Each of the SMA actuator wires 11 to 14 is held in tension, thereby applying a force between the support structure 4 and the lens element 2. Each of the SMA actuator wires 11 to 14 has a V-shape in which it is connected at its ends to the support structure 4 and is hooked over a respective connector 7 at its mid-point.

The SMA actuator wires 11 to 14 are connected at their ends to the base 3 of the support structure 4 by respective crimping members 5. The crimping members 5 crimp the respective SMA actuator wire 11 to 14 to hold it mechanically, optionally strengthened by the use of adhesive. The crimping members 5 also provide an electrical connection to the SMA actuator wires 11 to 14. However, any other suitable means for connecting the SMA actuator wires 11 to 14 may alternatively be used.

The connectors 7 have studs 8 at one end, around which the SMA actuators wires 11 to 14 are hooked. The SMA actuator wires 11 to 14 may slide freely against the studs 8 or may be fixed thereto, for example by a crimp.

The ends 9 of the connectors 7 opposite to the studs 8 are rigidly connected to the mounting ring 20 (by a mechanical connection that is not shown in FIG. 2, for clarity of the drawing). As the connectors 7 are outside the SMA actuator wires 11 to 14 (i.e. within the reflex angle between the portions of each SMA actuator wire 11 to 14 on either side of the respective connector 7) in this example, the connectors 7 are in tension from the force applied from the SMA actuator wires 11 to 14 to the lens element 2, but the connectors 7 could alternatively be arranged inside the SMA actuator wires 11 to 14 so that the connectors are in compression.

As described further below, the connectors 7 are laterally compliant between the studs 7 and the ends 9, in this example being resilient.

Each of the SMA actuator wires 11 to 14 extends parallel to the plane XY and is angled so that the portions of each SMA actuator wire 11 to 14 on either side of the respective connector 7 extend at an angle that in the example shown in FIG. 2 is slightly more than 90°. In general, that angle may take any value less than 180° so that the SMA actuator wires 11 to 14, on contraction, apply a force between the support structure 4 and the lens element 2 in the plane XY. That force is applied through the respective connector 7. Making that angle between the portions of each SMA actuator wire 11 to 14 on either side of the respective connector 7 close to 90°, for example within the range from 70° to 110° has the advantage of minimizing the size of the camera apparatus 1 perpendicular to the optical axis O.

As viewed along the optical axis O, the SMA actuator wires 11 to 14 are disposed outside the lens element 2 to avoid optical obstruction of the image, in the following arrangement. The SMA actuator wires 11 to 14 are arranged with rotational symmetry around the optical axis O and with mirror symmetry about a first axis X and a second axis Y in the plane XY orthogonal to the first axis X. Thus, a first pair of SMA actuator wires 11 and 12 are opposed along the first axis X and thereby arranged, on contraction, to drive movement of the lens element 2 relative to the support structure 4 in opposite directions along the first axis X. Similarly, a second pair of SMA actuator wires 13 and 14 are opposed along the second axis Y and thereby arranged, on contraction, to drive movement of the lens element 2 relative to the support structure 4 in opposite directions along the second axis Y.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA actuator wires 11 to 14 causes them to decrease in length. The SMA actuator wires 11 to 14 may be made of any suitable SMA material, for example Nitinol or another Titanium-alloy SMA material. Advantageously, the material composition and pre-treatment of the SMA actuator wires 11 to 14 is chosen to provide phase change over a range of temperature that is above the expected ambient temperature during normal operation and as wide as possible to maximise the degree of positional control.

On heating of one of the SMA actuator wires 11 to 14, the stress therein increases and it contracts. This causes movement of the lens element 2. A range of movement occurs as the temperature of the SMA increases over the range of temperature in which there occurs the transition of the SMA material from the Martensite phase to the Austenite phase. Conversely, on cooling of one of the SMA actuator wires 11 to 14 so that the stress therein decreases, it expands under the force from its opposing one of the SMA actuator wires 11 to 14. This allows the lens element 2 to move in the opposite direction.

As a result, the SMA actuator wires 11 to 14 are capable of being selectively driven to drive movement of the lens element 2 relative to the support structure 4 to any position in any direction in the plane XY. The magnitude of the range of movement depends on the geometry and the range of contraction of the SMA actuator wires 11 to 14 within their normal operating parameters.

The position of the lens element 2 relative to the support structure 4 perpendicular to the optical axis O is controlled by selectively varying the temperature of the SMA actuator wires 11 to 14. This is achieved by passing through SMA actuator wires 11 to 14 selective drive currents that provides resistive heating. Heating is provided directly by the drive current. Cooling is provided by reducing or ceasing the drive current to allow the SMA actuator wires 11 to 14 to cool by conduction, convection and radiation to the surroundings.

Each connector 7 provides a connection in the direction of in which force is applied through the connectors 7 from the respective SMA actuator wire 11 to 14 to the lens element 2 that is sufficiently rigid to drive movement of the lens element 2. However, each connector 7 is compliant laterally to that direction, i.e. the connectors 7 over which first pair of SMA actuator wires 11 and 12 are hooked are compliant laterally to the first axis X and the connectors 7 over which second pair of SMA actuator wires 13 and 14 are hooked are compliant laterally to the second axis Y. In this example, the compliance of the connectors 7 is achieved by the connectors 7 being resilient members.

The degree of compliance is selected to be sufficient for the connectors 7 to permit the movement of the lens element 2 relative to the respective SMA actuator wire 11 to 14 that is driven by the other pair of SMA actuator wires 11 to 14, that is in respect of the connectors 7 of the first pair of SMA actuator wires 11 and 12 to permit the movement of the lens element 2 driven by the second pair of SMA actuator wires 13 and 14 along the second axis Y, and vice versa. In this example where the connectors 7 are resilient, this may be achieved by selection of the dimensions and material of the connectors 7. As a result, the movements driven by the two pairs of SMA actuator wires 11 to 14 are prevented from hindering each other. On the other hand, if the connectors 7 were laterally rigid, they would prevent, or at least distort, the movement of the lens element 2 driven by the other pair of SMA actuator wires 11 or 14.

The camera apparatus 1 is very compact and allows the provision of an OIS function with minimal increase in the height of the camera apparatus 1 in the direction along the optical axis O, and a minimal increase in the footprint orthogonal to the optical axis O. The additional components needed for OIS, particularly the connectors 7 and crimping members 5, are located in the corners of the camera apparatus 1 where there is space around the lens element 2, and the parts of the camera apparatus 1 providing OIS are flat and very thin in the direction along the optical axis O. Furthermore, manufacture of the camera apparatus 1 is straightforward. An assembly comprising the SMA actuator wires 11 to 14 and the mounting ring 20 can be mounted on the support structure by fixing the crimping members 5 to the base 3 of the support structure 4. Further components of the camera apparatus 1 can be stacked on top in subsequent manufacturing steps. This accords with normal camera manufacturing procedures. It is noted in particular that these benefits can be achieved in the camera apparatus 1 employing just a single set of four SMA actuator wires 11 to 14.

In this camera apparatus 1, each of the SMA actuator wires 11 to 14 extends parallel to the plane XY. As the SMA actuator wires 11 to 14 cross one another as viewed along the optical axis O, the second pair of SMA actuator wires 13 and 14 is offset from the first pair of SMA actuator wires 11 and 12 in a direction perpendicular to said plane, as signified by the dotted lines. However, as a result of the SMA actuator wires 11 to 14 extending parallel to the plane XY, and by minimising the size of the offset, it is possible to minimise the size of the camera apparatus 1 along the optical axis O.

Various modifications to the camera apparatus 1 described above are possible. There will now be described some examples of possible modifications that may be applied in any combination.

In the above example, the second axis Y is orthogonal to the first axis X. However, strict orthogonality is not required, provided that the second axis Y is transverse to the first axis X so that movement can be driven in the plane XY by a combination of actuation of the first pair of SMA actuator wires 11 and 12 and the second pair of SMA actuator wires 13 and 14. Similarly, in the above example, due to the symmetrical arrangement, the SMA actuator wires 11 to 14 each apply force directly along the respective one of the first axis X and the second axis Y. However, this is not essential and the SMA actuator wires 11 to 14 may have a less symmetrical arrangement, provided that the first pair of SMA actuator wires 11 and 12 each apply at least a component of force along the first axis X so as to drive movement along the first axis X and the second pair of SMA actuator wires 13 and 14 each apply at least a component of force along the second axis Y so as to drive movement along the second axis Y. Indeed one of the benefits of the connectors 7 is that they can accommodate such variation.

The SMA actuator wires 11 to 14 may be arranged inclined at a non-zero angle to plane XY, which angle is preferably small, say at most 20°. In this case, the SMA actuator wires 11 to 14 in operation generate a component of force along the optical axis O that may tend to tilt or to move the lens element 2 in a direction parallel to the optical axis O. Such a component of force may be accepted or may resisted by providing a suspension system between the lens element 2 and the support structure 4.

Irrespective of whether the SMA actuator wires 11 to 14 are parallel to the plane XY or inclined at a small angle to the plane XY, the overall arrangement of the SMA actuator wires 11 to 14 can be made very compact, particularly in the direction along the optical axis O. The SMA actuator wires 11 to 14 are themselves very thin, typically of the order of 25 μm in diameter, to ensure rapid heating and cooling. The arrangement of SMA actuator wires 11 to 14 barely adds to the footprint of the actuator arrangement 10 and may be made very thin in the direction along the optical axis O. The height along the optical axis then depends on the thickness of the other components and the height necessary to allow manufacture.

The camera apparatus 1 has a square shape as viewed along the optical axis O but more generally could have any shape. The support structure 4 is illustrated schematically but could in general be any type of element suitable for supporting the lens element 2. More generally, the same type of actuator arrangement 10 may in general be applied to any type of movable element including ones other than a lens element.

In the above example, each of the SMA actuator wires 11 to 14 has connections at its ends to the support structure 4, but this is not essential. The connection of any one or any number of the SMA actuator wires 11 to 14 may be reversed. In that case, the arrangement remains as shown in FIG. 2 but any of the SMA actuator wires 11 to 14 that are reversed are connected at their ends to the lens element 2 (i.e. the crimping members 5 are mounted on the lens element 2) and the respective connector 7 is connected to the support structure 4. With such reversal, the forces applied between the lens element 2 and the support structure 4 remain the same and so is functionally equivalent to the camera apparatus 1 described above. That being said, connection of each of the SMA actuator wires 11 to 14 at its ends to the same one of the support structure 4 and the lens element 2 can simplify the construction. Furthermore, connection of each of the SMA actuator wires 11 to 14 at its ends the support structure 4 can simplify the making of electrical connections to the SMA actuator wires 11 to 14 from a control circuit 40 implemented in the IC chip 30 as described below.

In the above example, the SMA actuator wires 11 to 14 has connections at its ends that are fixed and the laterally compliant connector 7 is provided at its mid-points. However, an alternative is that the SMA actuator wires 11 to 14 are fixed at their mid-point and connected at their ends by connectors that are laterally compliant. This provides a similar functional effect. However, this arrangement may be harder to manufacture since it requires more connectors.

In the above example, the connectors 7 are laterally compliant by means of being resilient. However, the compliance may be provided by other mechanical means. One possibility is that the compliance may be provided by the connectors 7 being rocker arms.

Figure 3:
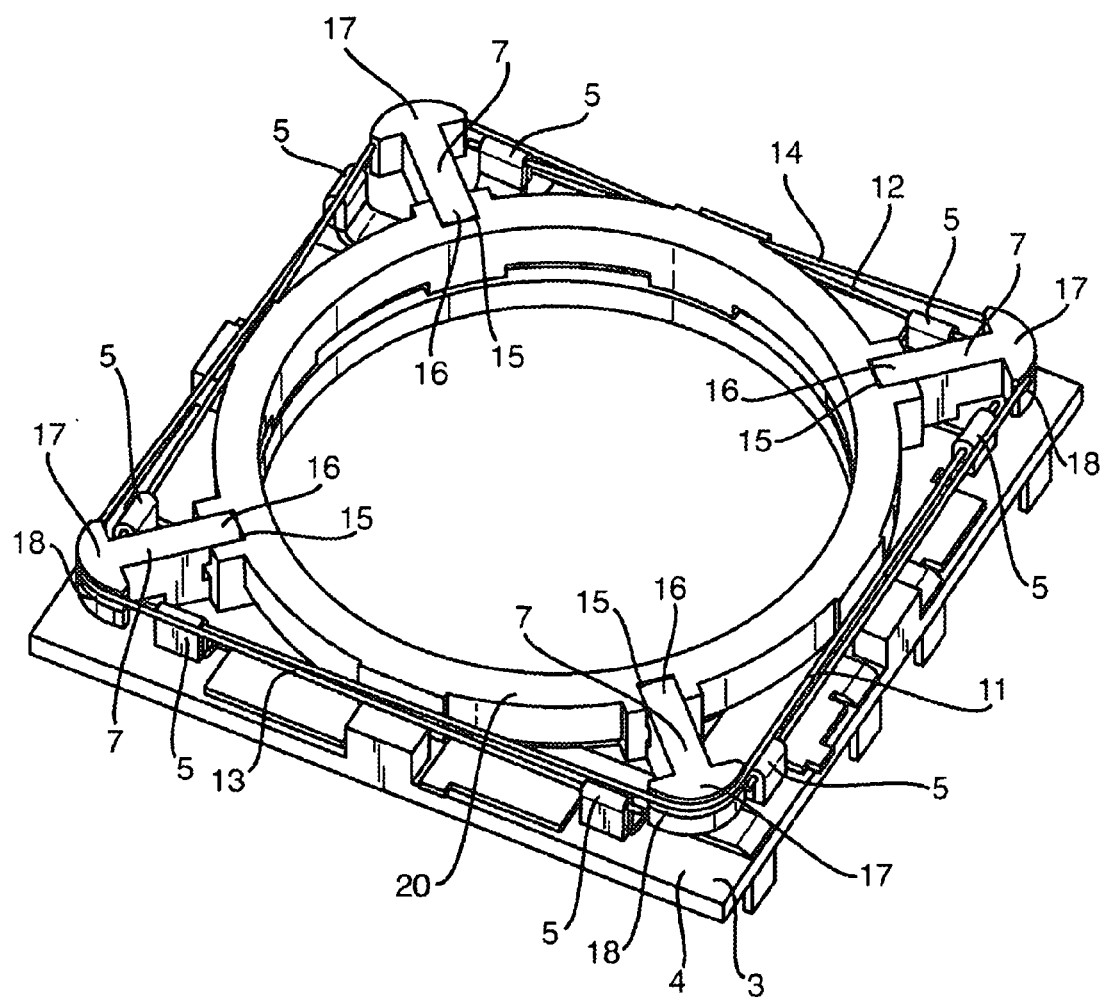
FIG. 3 is a perspective view of the camera apparatus in modified form.
Figure 4:
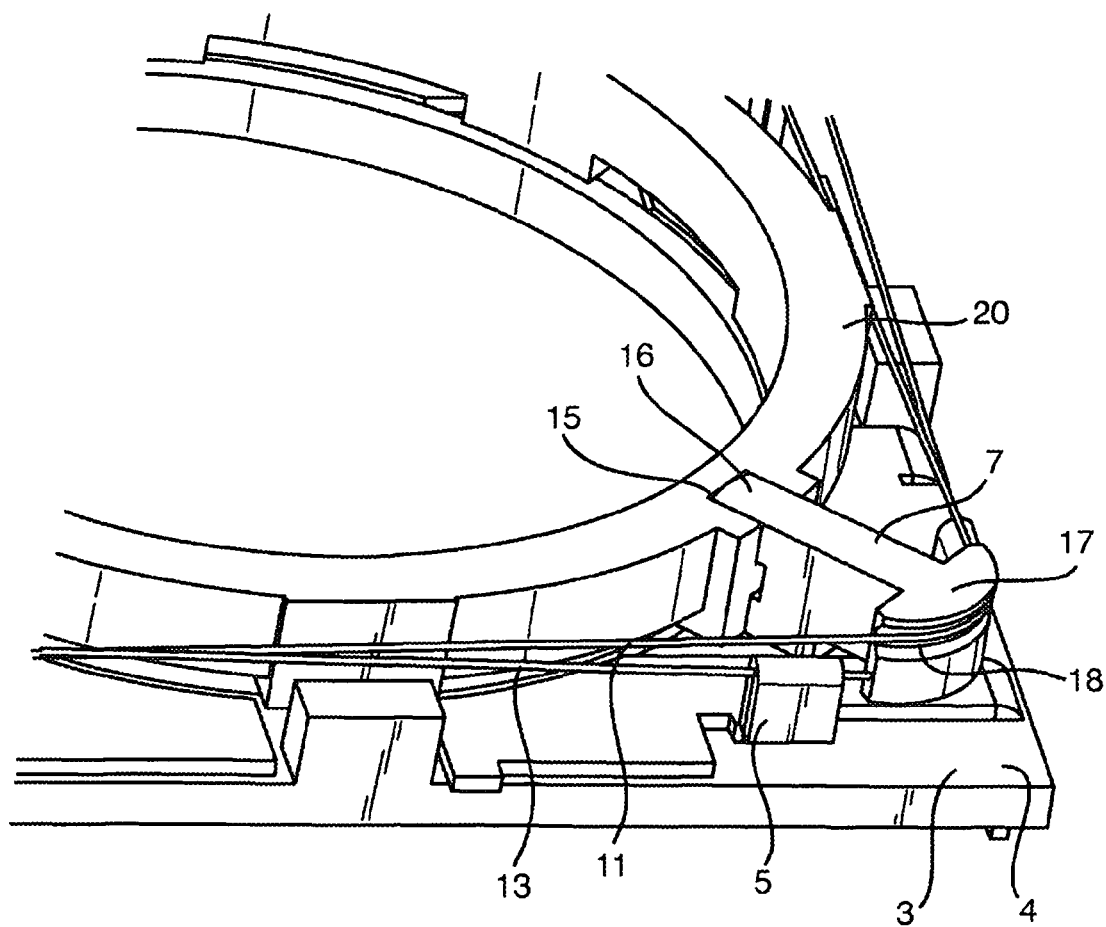
FIG. 4 is an expanded view of part of the camera apparatus of FIG. 3.

FIGS. 3 and 4 illustrate an example of a camera apparatus 1 having the same construction as described above but with modifications so that the connectors 7 are rocker arms. For brevity, common elements have the same reference numerals and a description thereof is not repeated.

The mounting ring 20 is formed on its outside with four recesses 15 that are equally spaced around the mounting ring 20. Into each recess 15 is fitted a connector 7 that in this example is a rocker arm that is able to rock in the recess 15 to provide the lateral compliance. This may be achieved by the inner end 16 of the connector 7 having a rolling contact with the inner surface of the recess 15 and fitting in the recess 15 with sufficient clearance to allow the rocking. Each of the four SMA actuator wires 11 to 14 is hooked over the outer end 17 of the connector 7, in this example located in a groove 18 in the outer end 17 of the connector 7. Thus the SMA actuator wires 11 to 14 apply a force to the lens element 2 through the connectors in compression.

The camera apparatus 1 functions in essentially the same manner as described above in respect of the case that the connectors are resilient, except that the connectors 7 permit the movement of the lens element 2 relative to the respective SMA actuator wire 11 to 14 that is driven by the other pair of SMA actuator wires 11 to 14 by rocking in their recesses 15.

The length of the connector 7 is chosen to provide the desired degree of movement at the outer end 18. For example, in a typical miniature camera having a footprint of 8.5 mm square, the length of the connector might be of the order of 1.5 mm. It has been found that for appropriate image shake correction, a movement of about 100 µm is required. Thus, for the outer end 18 of the connector 7 to move 100 µm, the angle of tilt is about 4°. Such a small tilt can easily be accommodated by the rolling contact of the inner end 16 of the connector 7 inside the recess 12. The width of the recess 12 is selected to be just enough to allow this rocking.

In some circumstances, external forces may move the connector 7 within the recess 12, for example if the camera apparatus 1 is dropped on to a hard surface or otherwise shocked. The force exerted by the SMA actuator wires 11 to 14 will re-instate the contact at the inner end 16 of the connector 7 after the shock event is over, but the connector 7 may have shifted sideways in its recess 12 and may for example end up against one or other side wall of the recess 12. On subsequent activation, full shake correction will not immediately be available. On activation, the SMA actuator wires 11 to 14 will pull the connector 7 towards the centre, overcoming the friction at the contact point. After a full activation excursion, the connector 7 will be re-centred and full shake correction can resume. To prevent such a possible short-term loss of shake correction, a centering cycle can be undertaken, for example after a shock event is sensed or every time the camera powers up. This centering cycle consists of activating the SMA actuator wires 11 to 14 to their full excursion in all directions, to ensure re-centering of all the connectors 7.

In this example, the SMA actuator wires 11 to 14 are slightly inclined to the plane XY. This slight inclination is space efficient in that it allows space for the crimping members 5 and allows the SMA actuator wires 11 to 14 to cross without touching. Because of the inclined nature of the SMA actuator wires 11 to 14, the force applied thereby deviates slightly from the ideal of being orthogonal to the optical axis O. t has been found that this deviation is not sufficient to adversely affect the OIS operation.

Figure 5:
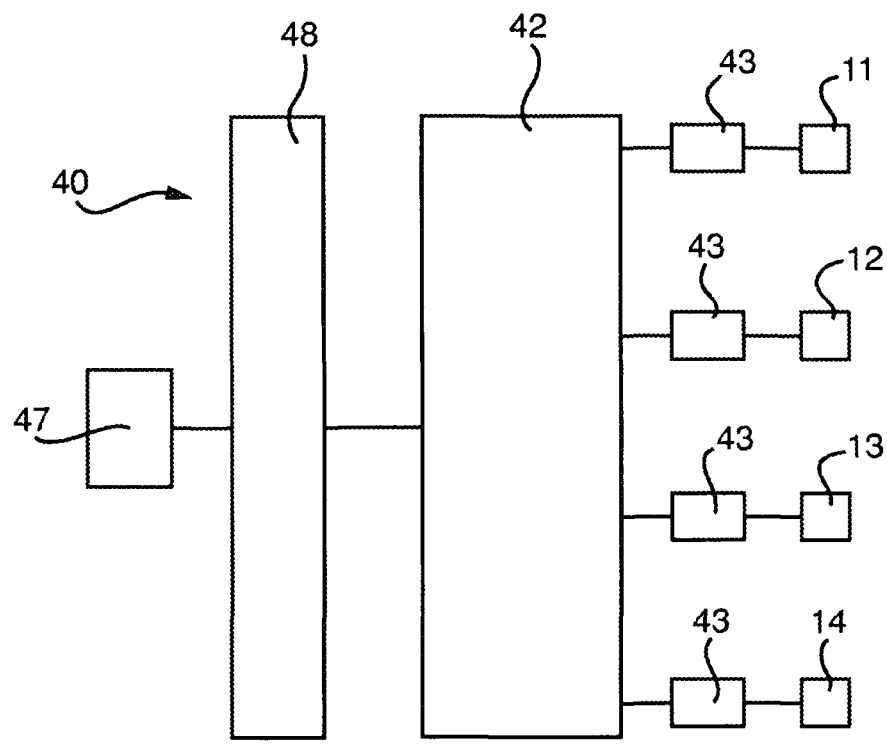
FIG. 5 is a diagram of a control circuit for the SMA actuator wires.

The control of the SMA actuator wires 11 to 14 is effected by a control circuit 40 shown in FIG. 5 implemented in the IC chip 30. The control circuit 40 which generates and supplies drive signals to each of the SMA actuator wires 11 to 14 and is arranged as follows.

The control circuit 40 includes a gyroscope sensor 47 that outputs a signal representative of the angular velocity of the lens element 2, thereby acting as a vibration sensor that detects the vibrations that the camera apparatus 1 is experiencing. The gyroscope sensor 47 is typically a pair of miniature gyroscopes, for detecting vibration around two axes perpendicular to each other and the optical axis O, although in general larger numbers of gyroscopes or other types of vibration sensor could be used.

The output signals from the gyroscope sensor 47 are supplied to an OIS controller 48 that may be implemented in a processor. The OIS controller 48 derives movement signals that represent the movement of the lens element 2 needed to compensate for the movement of the camera apparatus 1 as a whole, and therefore stabilise the image sensed by the image sensor 6. As the gyroscope sensor 47 is mounted on the support structure 4 the output signals are representative of the vibration of the support structure 4. OIS is effected by moving the lens element 2 laterally in opposition. Accordingly, the OIS controller 48 generates movement signals providing a desired movement which is opposite to the actual tilt as measured by the gyroscope sensor 47. The OIS controller 48 may process the output signals from the gyroscope sensor 47, for example by filtering them, prior to generating the movement signals.

The movement signals from the OIS controller 48 are supplied to a matrix controller 42 that may be implemented in a processor or in hardware. Although the matrix controller 42 and the OIS controller 48 are illustrated as separate components for ease of understanding, they may be implemented in a common processor.

The matrix controller 42 generates a control signal for each of the SMA actuator wires 11 to 14 on the basis of the movement signals. This uses a matrix calculation that relates the necessary contraction or expansion (i.e. length) of each one of the SMA actuator wires 11 to 14 to achieve the desired movement. Any desired movement has components along each of the first axis X and the second axis Y in which movement is driven by the pairs of the SMA actuator wires 11 to 14 identified above. Thus, for each of those components of the desired movement represented by the movement signal, the control signals provide for differential contraction of the first pair of SMA actuator wires 11 and 12 and the second pair of actuator wires 13 and 14. In this manner, any desired movement may be translated into control signals for selectively actuating an appropriate combination of the SMA actuator wires 11 to 14. Thus the matrix calculation takes into account the actual geometrical arrangement of the SMA actuator wires 11 to 14 in the camera apparatus 1.

The control signals may be modified by various compensation algorithms to compensate for non-linear effects such as hysteresis in the SMA material.

Figure 6:
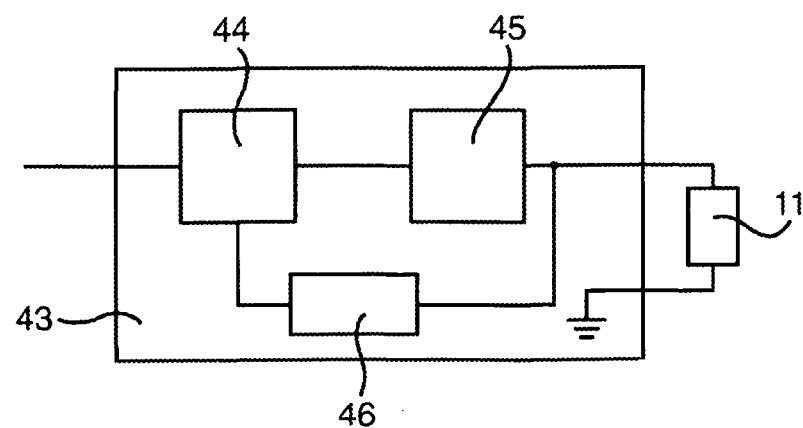
FIG. 6 is a diagram of a drive circuit of the control circuit.

Each one of the SMA actuator wires 11 to 14 is connected to a respective drive circuit 43 that is supplied by the matrix controller 42 with the control signal for the corresponding one of the SMA actuator wires 11 to 14. The drive circuits 43 generate a drive signal in accordance with the control signal and supply the drive signal to the SMA actuator wire 11 to 14. The drive circuits 43 have an identical arrangement which is shown in FIG. 6 in respect of the first SMA actuator wire 11 and arranged as follows.

The drive circuit 43 includes a drive controller 44 that is supplied with the control signal from the matrix controller 42 and controls a driver 45 using resistance feedback. The drive controller 44 may be implemented in a processor. Although the matrix controller 42 and the drive controllers 44 are illustrated as separate components for ease of understanding, they may be implemented in a common processor.

The driver 45 is connected to supply the drive current to the SMA actuator wire 11. The driver 45 may be a constant-voltage current source or a constant-current current source. For example, in the latter case the constant current might be of the order of 120 mA.

The drive circuit 43 further includes a detection circuit 46 arranged to detect the resistance of the SMA actuator wire 11. In the case that the driver 45 is a constant-current current source, the detection circuit 46 may be a voltage detection circuit operable to detect the voltage across the SMA actuator wire 11 which is a measure of the resistance of the SMA actuator wire 11. In the case that the driver 45 is a constant-voltage current source, the detection circuit 46 may be a current detection circuit. For a higher degree of accuracy the detection circuit 46 may comprise a voltage detection circuit and a current detection circuit operable to detect both the voltage and current across the SMA actuator and to derive a measure of resistance as the ratio thereof.

The drive controller 44 is arranged to control the driver 45 to supply a pulse-width modulated current. The drive controller 44 receives the resistance measured by the detection circuit 46 and uses it as a feedback signal in a closed-loop control algorithm to control the PWM duty cycle of the driver 45 to actuate the SMA actuator wire 11 in accordance with the demand represented by the overall control signal. The closed-loop control may be proportional, or may include integral and/or differential components.

By using the electrical resistance of the SMA actuator wire 11 as a feedback parameter that relates to position, over the functional movement range the contraction and expansion of the SMA material is approximately linear with its electrical resistance. Non-linearities, including hysteresis and creep, occur to some extent. These may be ignored, but for better linearity, these may be accounted for in the closed-loop control algorithm.

The SMA actuator wires 11 to 14 may be provided with a sufficient speed of response to provide OIS. Typically each one of the SMA actuator wire 11 to 14 is proportionally driven so as to control the position over a frequency bandwidth up to 10 Hz, up to 20 Hz, or up to 30 Hz. A perceived drawback of SMA as an actuator is its slow response time. As an SMA material is thermally driven, the response time is limited by the temperature change achievable, being associated with thermal conductivity, specific heat capacity, and thermal mass.

Whilst heating of the SMA actuator wires 11 to 14 can be increased by increasing the power of the drive current, cooling is dependent on the thickness of the SMA actuator wires 11 to 14. This thickness is selected to provide the desired response time during cooling. For example, if the SMA actuator wires 11 to 14 are of thickness 25 μm, being currently the thinnest available commercial material, the thermal response begins to roll off at 4 Hz. Based on analysis of the OIS function, the functional requirement is to provide movement compensation over a bandwidth of up to 30 Hz. However, the amplitude of response required drops markedly over the operating bandwidth, typically for the camera apparatus 1 described above from about 70 μm at about 1 Hz, to less than about 10 μm at over 20 Hz. Surprisingly, in spite of the roll-off in SMA actuator wire response above 4 Hz, the SMA actuator wires 11 to 14 are still able to deliver the displacement requirements at 30 Hz, and so are able to successfully meet the actuation requirements of the OIS for miniature cameras.

The invention claimed is:

1. A shape memory alloy actuation apparatus for moving a movable element relative to a support structure, the shape memory alloy actuation apparatus comprising:
   a support structure;
   a movable element supported on the support structure in a manner allowing movement of the movable element relative to the support structure in any direction in a plane; and
   four shape memory alloy actuator wires, each shape memory alloy actuator wire being connected at its ends to one of the support structure and the movable element and being hooked over a respective connector connected to the other of the of the support structure and the movable element, a first pair of the shape memory alloy actuator wires being arranged, on contraction, to drive movement of the movable element relative to the support structure, through the respective connectors, in opposite directions along a first axis in said plane, a second pair of the shape memory alloy actuator wires being arranged, on contraction, to drive movement of the movable element relative to the support structure, through the respective connectors, in opposite directions along a second axis in said plane transverse to said first axis,
   wherein each connector is a rocker arm that is compliant in a direction in said plane laterally to the directions in which the respective shape memory alloy actuator wire drives movement of the movable element relative to the support structure.

2. The shape memory alloy actuation apparatus according to claim 1, wherein the shape memory alloy actuation apparatus is a camera apparatus further comprising an image sensor fixed to the support structure, and the movable element comprises a camera lens element comprising one or more lenses arranged to focus an image on the image sensor, said plane being perpendicular to the optical axis of the camera lens element.

3. The shape memory alloy actuation apparatus according to claim 2, wherein the at least one lens has a diameter of at most 10 mm.

4. The shape memory alloy actuation apparatus according to claim 2, further comprising:
   a vibration sensor arranged to generate output signals representative of the vibration of the shape memory alloy actuation apparatus; and
   a control circuit arranged to generate drive signals for the shape memory alloy actuator wires in response to the output signals of the vibration sensor for driving the movement of the camera lens element to stabilize the image sensed by the image sensor, and to supply the generated drive signals to the shape memory alloy actuator wires.

5. The shape memory alloy actuation apparatus according to claim 2, wherein the shape memory alloy actuator wires are disposed outside the lens element as viewed along the optical axis.

6. The shape memory alloy actuation apparatus according to claim 1, further comprising:
   a control circuit arranged to generate drive signals for the shape memory alloy actuator for driving the movement of the movable element relative to the support structure in said plane, and to supply the generated drive signals to the shape memory alloy actuator wires.

7. The shape memory alloy actuation apparatus of claim 1, wherein the respective connectors are connected to the other of the support structure and the movable element with a rolling contact therebetween.

8. The shape memory alloy actuation apparatus according to claim 1, wherein the shape memory alloy actuator wires extend parallel to said plane.

9. The shape memory alloy actuation apparatus according to claim 1, wherein the second pair of shape memory alloy actuator wires is offset from the first pair of shape memory alloy actuator wires in a direction perpendicular to said plane.

10. The shape memory alloy actuation apparatus according to claim 1, wherein the portions of each shape memory alloy actuator wire on either side of the respective connector extend at an angle of less than 180° as viewed perpendicular to the plane.

11. The shape memory alloy actuation apparatus according to claim 1, wherein each shape memory alloy actuator wire is connected at its ends to the same one of the support structure and the movable element.

12. The shape memory alloy actuation apparatus according to claim 1, wherein each shape memory alloy actuator wire is connected at its ends to the support structure.

13. The shape memory alloy actuation apparatus according to claim 1, wherein said second axis is orthogonal to said first axis.

14. The shape memory alloy actuation apparatus according to claim 1, wherein the movable element is supported on the support structure solely by the shape memory alloy actuator wires.

15. A shape memory alloy actuation apparatus for moving a movable element relative to a support structure, the shape memory alloy actuation apparatus comprising:
   a support structure;
   a movable element supported on the support structure in a manner allowing movement of the movable element relative to the support structure in any direction in a plane; and
   four shape memory alloy actuator wires, each shape memory alloy actuator wire being connected at its ends to one of the support structure and the movable element and being hooked over a respective connector connected to the other of the of the support structure and the movable element, a first pair of the shape memory alloy actuator wires being arranged, on contraction, to drive movement of the movable element relative to the support structure, through the respective connectors, in opposite directions along a first axis in said plane, a second pair of the shape memory alloy actuator wires being arranged, on contraction, to drive movement of the movable element relative to the support structure, through the respective connectors, in opposite directions along a second axis in said plane transverse to said first axis,
   wherein each connector is a resilient member that is compliant in a direction in said plane laterally to the directions in which the respective shape memory alloy actuator wire drives movement of the movable element relative to support structure.

16. The shape memory alloy actuation apparatus according to claim 15, wherein the shape memory alloy actuation apparatus is a camera apparatus further comprising an image sensor fixed to the support structure, and the movable element comprises a camera lens element comprising one or more lenses arranged to focus an image on the image sensor, said plane being perpendicular to the optical axis of the camera lens element.

17. The shape memory alloy actuation apparatus according to claim 16, wherein the at least one lens has a diameter of at most 10 mm.

18. The shape memory alloy actuation apparatus according to claim 17, further comprising:
   a vibration sensor arranged to generate output signals representative of the vibration of the shape memory alloy actuation apparatus; and
   a control circuit arranged to generate drive signals for the shape memory alloy actuator wires in response to the output signals of the vibration sensor for driving the movement of the camera lens element to stabilize the image sensed by the image sensor, and to supply the generated drive signals to the shape memory alloy actuator wires.

19. The shape memory alloy actuation apparatus according to claim 16, wherein the shape memory alloy actuator wires are disposed outside the lens element as viewed along the optical axis.

20. The shape memory alloy actuation apparatus according to claim 15, further comprising:
   a control circuit arranged to generate drive signals for the shape memory alloy actuator for driving the movement of the movable element relative to the support structure in said plane, and to supply the generated drive signals to the shape memory alloy actuator wires.

21. The shape memory alloy actuation apparatus according to claim 15, wherein the shape memory alloy actuator wires extend parallel to said plane.

22. The shape memory alloy actuation apparatus according to claim 15, wherein the second pair of shape memory alloy actuator wires is offset from the first pair of shape memory alloy actuator wires in a direction perpendicular to said plane.

23. The shape memory alloy actuation apparatus according to claim 15, wherein the portions of each shape memory alloy actuator wire on either side of the respective connector extend at an angle of less than 180° as viewed perpendicular to the plane.

24. The shape memory alloy actuation apparatus according to claim 15, wherein each shape memory alloy actuator wire is connected at its ends to the same one of the support structure and the movable element.

25. The shape memory alloy actuation apparatus according to claim 15, wherein each shape memory alloy actuator wire is connected at its ends to the support structure.

26. The shape memory alloy actuation apparatus according to claim 15, wherein said second axis is orthogonal to said first axis.

27. The shape memory alloy actuation apparatus according to claim 15, wherein the movable element is supported on the support structure solely by the shape memory alloy actuator wires.

* * * * *